United States Patent [19]

Rauschelbach

[11] 3,848,833

[45] Nov. 19, 1974

[54] AIRCRAFT AUTOMATIC FLIGHT CONTROL SYSTEM

[75] Inventor: Paul A. Rauschelbach, Phoenix, Ariz.

[73] Assignee: Sperry Rand Corporation, New York, N.Y.

[22] Filed: July 14, 1972

[21] Appl. No.: 271,867

[52] U.S. Cl. .......... 244/77 D, 235/150.2, 244/77 F, 244/77 M, 318/434, 318/635
[51] Int. Cl. .......................................... B64c 13/18
[58] Field of Search ...... 235/150.2, 150.22; 244/77; 318/6, 143, 146, 257, 294, 332, 341, 345, 434, 513, 563, 565, 584, 585, 591, 599, 635; 343/107, 108 R

[56] References Cited
UNITED STATES PATENTS

| | | | |
|---|---|---|---|
| 3,058,697 | 10/1962 | Tribken | 244/77 R |
| 3,116,899 | 1/1964 | Jude et al. | 244/77 A |
| 3,167,276 | 1/1965 | Moosbrugger et al. | 244/77 D |
| 3,369,160 | 2/1968 | Koppel et al. | 318/635 X |
| 3,386,689 | 6/1968 | Parker et al. | 244/77 F |
| 3,414,795 | 12/1968 | Weiser | 318/434 X |
| 3,417,945 | 12/1968 | Reynolds et al. | 244/77 A |
| 3,510,737 | 5/1970 | Brown et al. | 318/635 X |
| 3,521,839 | 7/1970 | Diani | 244/77 D |
| 3,569,810 | 3/1971 | Thiele | 318/434 X |
| 3,635,428 | 1/1972 | Nelson et al. | 244/77 A |
| 3,665,217 | 5/1972 | Adams et al. | 244/77 M X |
| 3,682,417 | 8/1972 | Burkland et al. | 244/77 D |
| 3,706,923 | 12/1972 | Dunfield | 318/599 X |

*Primary Examiner*—Milton Buchler
*Assistant Examiner*—Stephen G. Kunin
*Attorney, Agent, or Firm*—Howard P. Terry

[57] ABSTRACT

An automatic flight control system for aircraft providing improved aircraft response to input displacement commands, especially of the generally step input type, in a simple and economical manner; and further providing an improved yet economical control wheel steering capability. An improved automatic pilot electric surface servomotor system is also disclosed. Smooth and consistent roll acceleration limiting to step-like or abrupt roll attitude displacement commands are provided by rate limiting the displacement signal and then passing the limited signal through a simple lag filter having a predetermined time constant. Control wheel steering is available to the pilot by means of a wheel mounted switch which, when actuated, declutches the autopilot servoes, synchronizes the autopilot references during manual maneuvering through the aircraft manual control mechanism and, upon release of the switch re-establishes any preselected vertical path mode and/or establishes a roll attitude hold mode. Operation of CWS switch may be used to override various autopilot limits and upon release of switch maintains the overridden limit attitude; the autopilot automatically re-establishing automatic flight path demand control when the path demand signal equals the attitude limit established by the human pilot during control wheel steering. The autopilot surface servomotor control loop is characterized by an improved apparatus for limiting the torque output thereof by providing current feedback to the servo amplifier.

18 Claims, 5 Drawing Figures

AIRCRAFT AUTOMATIC FLIGHT CONTROL SYSTEM

BACKGROUND OF THE INVENTION

1. Field of the Invention

The present invention relates generally to automatic flight control systems for aircraft and more specifically to automatic pilots for aircraft which provides great flexibility in terms of its adaptation to a large variety of aircraft types and aerodynamic configurations particularly of the "executive" or "business" type and which requires a minimum of installation complexity and electrical adjustment after installation.

2. Description of the Prior Art

Historically, and particularly over the past 20 years or so, automatic pilots for aircraft of the large commercial transport type have developed from functionally simple but electromechanically complex systems which were designed so that they could be adapted to a large variety of aircraft types to today's functionally, electronically and mechanically complex systems designed specifically for a certain aircraft model. Early in this period, autopilots for the smaller, business or general aviation aircraft were practically non-existent while later some business and executive type aircraft were equipped with the simplest form of autopilot, primarily of the pilot relief type which provided attitude stabilization with minimal maneuver capability, such as turn and pitch, through an auxiliary controller on the cockpit panel. Of course, the primary concern of the operators of such aircraft was the cost of the autopilot. With the advent of the relatively sophisticated turboprop and turbojet business, executive and general aviation aircraft with its higher performance, increased speed and increased cockpit work load, not only is an automatic flight control system desired for pilot relief and simple but effective manuever capability, but also for more fully automated control including automatic flight path control and particularly maneuver control through the pilot's control wheel. In short, here is a desire for most of the sophisticated capability of the automatic flight control systems for the large commercial jets transports but at a small fraction of the cost.

The autopilot of the present invention provides much of the functional and operational sophistication of the commercial transport autopilot system but are achieved by design innovations which provide greatly reduced manufacture and installation costs.

For example, Applicant's Assignee's U.S. Pat. No. 3,386,689 illustrates schematically the roll channel of an automatic pilot for a particular multi-jet commercial transport aircraft and includes both manual maneuver capability through a pedestal controller, flight path control including radio defined paths and finally manuever control through the pilot's control wheel, hereinafter referred to as CWS. It will be noted that turn commands, such as turning a new selected heading, is accomplished by commanding a bank angle suitably limited as to displacement and rate, through an electromechanical servo arrangement acting as an integrator, roll acceleration limiting being accomplished by suitably controlling the response characteristic of the motor-generator loop. Electromechanical devices such as this are complex, heavy and of course very expensive.

All solid state electronic roll attitude command circuits have been employed in the past, however, these have been relatively complex electronically and quite expensive, particularly in connection with limiting roll acceleration in response, for example, to a heading select command. In one arrangement, the step command signal was rate limited and the roll acceleration limit was provided by a lag loop in parallel with the rate limiter so as to effectively program the output of the rate limiter. Furthermore, the rate limit was within the command integrator loop which further complicated the design of the lag program network.

Control wheel steering modes for autopilots have been available for many years for both military and commercial aircraft. An early example is illustrated in Applicant's Assignee's U.S. Pat. No. 2,408,770 wherein force transducers on the control wheel supply control signals to the autopilot servoes independently of the stable references, i.e., a servo boost type of system. Similar systems, also using force transducers, place the references in follow-up on themselves and provide control signals to the autopilot servoes. Still another system is disclosed in the above-referenced U.S. Pat. No. 3,386,689 wherein force transducers on the control wheel with signal threshold circuits, insert maneuver commands to the autopilot system through the autopilot which in turn control the surface servoes. All of these techniques require force sensors on the control wheel and hence are not especially practicable in the general aircraft autopilot market because of difficult and expensive installation requirements. For example, it is very difficult to install force transducers in the many different aircraft rigging arrangements. Wheel force transducers would require the purchase of a new control wheel adding greatly to the expense of the autopilot. Further each force transducer's threshold and signal characteristics would have to be tailored to each installation thereby increasing installation costs. Furthermore, CWS systems employing force sensors which control the autopilot servoes require elaborate and complex apparatus including bob-weights of springs, non-linear linkages, bungees and the like for overcoming the inherent mechanical conflict between the direct mechanical connection between the pilots' control wheel and the surface and the automatic pilot servo connection thereto in response to the CWS force signals. This complexity results in the requirement that some form of artificial feel be added in the system so that the pilot thinks he is flying manually. All of this complexity is eliminated with the CWS system of the present invention.

In the past, the electric surface servomotor control loop of an autopilot was torque limited in two classical manners, electric and mechanical. In the electrical scheme, a resistor was placed in the power supply to the servomotor which with the known impedance of the servomotor provided a limit on the maximum current that could be drawn by the motor. This type of torque limiting has a number of disadvantages including variations in the torque limit caused by supply voltage variations, temperature and/or motor resistance. The mechanical scheme involved slip clutches, ball-detent arrangements and the like. These have the usual mechanical disadvantages of wear, material fatigue, sticking after long periods of non-use, all of which result in uncontrollable and inaccurate torque limit thresholds.

SUMMARY OF THE INVENTION

The above and other technical and economic disadvantages of prior art systems are avoided or overcome by the automatic flight control system of the present invention. For example, roll command acceleration limiting is provided by a very simple, economic and yet very effective circuit arrangement comprising a simple lag circuit immediately following the roll rate limiter which, independently of the rate limiter serves to shape the rate limit output signal to provide the desired roll acceleration limit. This unique circuit arrangement assures a consistent and comfortable roll entry and roll exit.

The control wheel steering concepts of the autopilot of the present invention provide for the general aviation pilot all the control wheel steering operational conveniences of the sophisticated autopilot for the commercial transport without the latter's complexity and expense. The economy derives primarily from the fact that no complex and often marginally reliable force sensors and electronic threshold detectors and force signal amplifiers are needed and also no need for force sensors in the control wheel or control surface rigging thereby eliminating tedious and time consuming installation costs which involves extensive modification of the aircraft's control rigging. CWS is accomplished in the present invention in an extremely simple fashion. A simple push button on the control wheel, when activated by the pilot, declutches the aileron and elevator autopilot servomotors and at the same time controls various logic functions to synchronize the attitude displacement references. The pilot now manuevers his aircraft through the normal aircraft manual controls to the desired attitude and upon release of the switch, logic functions re-establish whatever path and/or attitude mode was pre-existing or selected during CWS operation. In addition, the CWS mode is arranged to override certain predetermined automatic pilot attitude or maneuver limits and upon release of the CWS switch the autopilot logic automatically re-establishes automatic control when the attitude or path error equals the limit established during CWS.

Control of the autopilot surface servomotor torque is accomplished electronically. The current being drawn by the servomotor in driving the loaded surface is fed back to the servomotor input through a current limiter which in turn limits the maximum current that can be supplied to the motor. This positive current limit feedback scheme is not affected by power supply transients, temperature and/or motor resistance, and is wholly electronic, the above-mentioned disadvantages are overcome and provides a high degree of accuracy in torque control which, in turn, allows greater autopilot control authority without exceeding hardover performance requirements. To insure system safety, each axis current limit is fully monitored against failure. This is accomplished by comparison monitoring the current feedback signal of each servo whereby if a failure of any current limiter occurs the autopilot is disengaged.

It is therefore a principal object of the present invention to provide a simple, economic autopilot primarily for general aviation aircraft having many of the operational features of its sophisticated commercial transport counterpart.

A further primary object of this invention is to provide simple and economic roll acceleration limit in response to a bank attitude command.

A still further object of the invention is to provide a simple, economic highly reliable and operationally convenient control wheel steering mode of operation of an automatic pilot.

Another object of the invention is to provide positive and consistent torque limiting of the surface servo actuators.

Other objects, features and advantages of the autopilot system of the present invention not at this time particularly enumerated will become apparent as a description of a preferred embodiment thereof proceeds, reference being made to the accompanying drawings.

DESCRIPTION OF THE PREFERRED EMBODIMENT

Figure 1A:
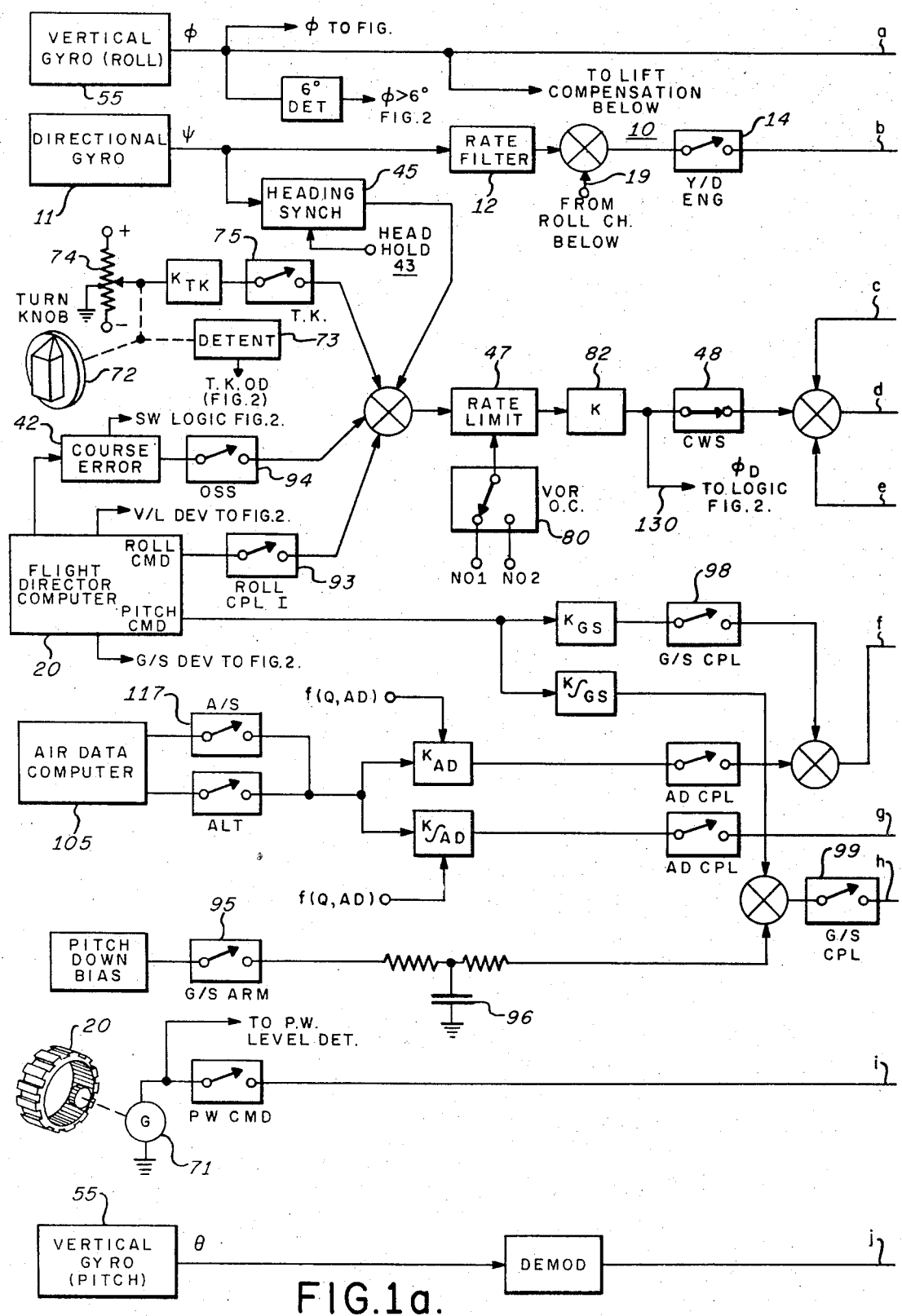
FIG. 1 is a schematic block diagram of a complete three axis automatic flight control system embodying the concepts of the present invention.
Figure 1B:
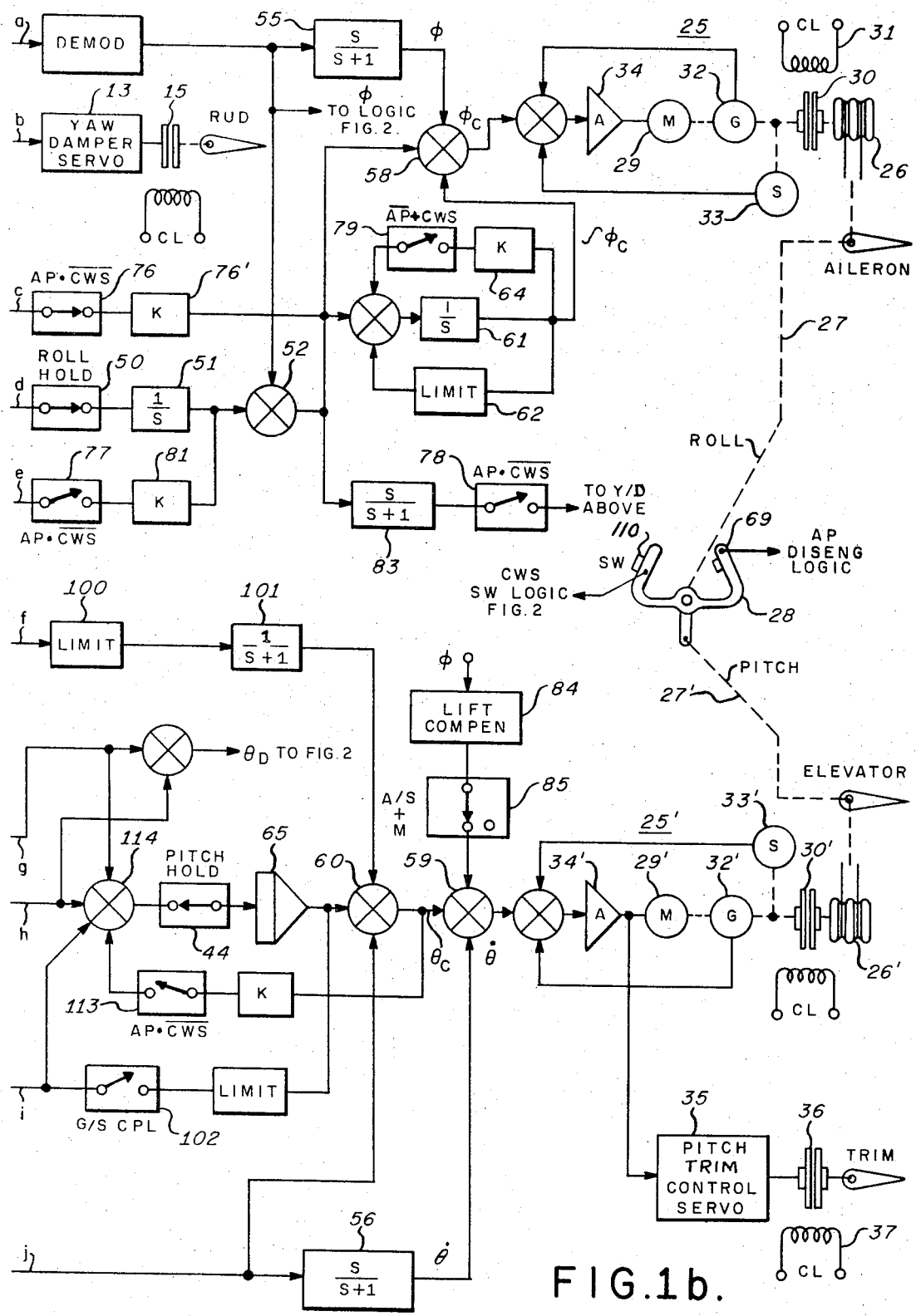
Figure 2:
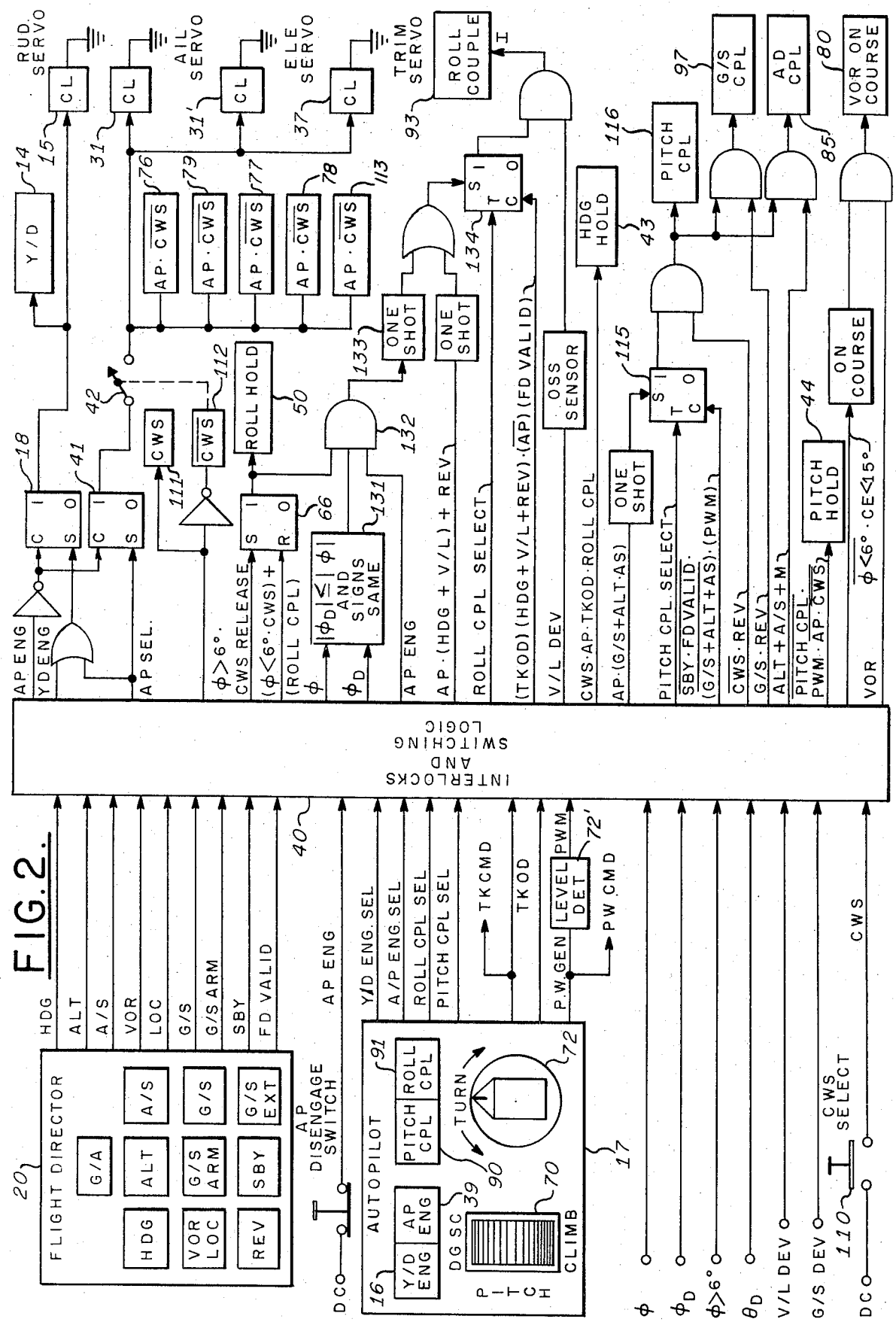
FIG. 2 is a schematic block diagram of the switching logic which controls the switching elements of FIG. 1.

Referring now to FIGS. 1 and 2, there is illustrated schematically a complete automatic flight control system including automatic stabilization of the aircraft about its yaw, pitch and roll axes, maneuver commands for the roll and pitch axes, together with coupler equipment for automatically controlling the craft to approach and maintain predetermined flight paths such as radio beams and those flight paths defined by altitude and airspeed sensors. Automatic pitch trim is also provided. The automatic pilot computer utilizes primarily direct current signal circuits for reliability and economy.

The yaw channel is illustrated very compactly at 10 in the upper left of FIG. 1, its details of construction and operation being more fully disclosed in Applicant's Assignee's copending application Ser. No. 284,781 filed Aug. 30, 1972, in the name of Ronald Thomas and entitled "Yaw Damper for Aircraft." Briefly, the yaw channel comprises basically a yaw damper, the short term yaw rate signal therefore being derived from the yaw displacement signal from a conventional directional gyro 11 through rate networks and filter 12. The filter portion of the circuit 12 is tuned to pass damping signals at the Dutch roll frequencies and to block steady state yaw rate components during steady turns. The yaw damper signal is applied to a rudder servomotor system 13 through yaw damper engage switch 14 and drives the aircraft rudder through clutch 15. Also included in the yaw damper signal chain is a roll rate cross feed 19 from the roll channel to provide coordination during turns. The yaw damper is engageable independently of the roll and pitch channel as by Y/D engage momentary push button 16 on the autopilot control panel 17 of FIG. 2. However, it will be noted that the logic flip-flop 18 of FIG. 2 is arranged so that if Y/D has not been selected and the autopilot mode, A/P, is selected, Y/D is automatically simultaneously selected. This assures yaw damper operation and turn coordination in the A/P modes. As pointed out above, the details of the yaw damper circuits are more fully described in the above-identified copending application.

At this point, the logic conventions illustrated in the drawings should be explained. In FIG. 1, each of the switches is illustrated schematically as a relay switch but in practice is preferably a solid state device such as a transistor switch. The functional notation associated with each switch denotes that the switch changes its state from that illustrated when the noted function is selected or otherwise occurs. Additionally, and especially in FIG. 2, standard and conventional logic nomenclature is used in association with each of the leads.

For convenience, the definition of typical abbreviations used herein are as follows:
AP — Autopilot engage select
Y/D — Yaw Damper engage select
CPL — Couple (Autopilot coupled to selected path modes)
HDG — Heading Select
ALT — Altitude Select
A/S — Airspeed Select
V/L — VOR/Localizer Select
G/S — Glide Slope
REV — Reverse Localizer Course
SBY — Standby
PWM — Pitch Wheel Mode
G/A — Go Around
TKOD — Turn Knob out of Detent Also, before proceeding with a description of the roll and pitch channels, herein referred to as the A/P channels, it should be pointed out that in the embodiment illustrated, the autopilot channels receive computed flight path information from a flight director computer system illustrated schematically at 20 in FIGS. 1 and 2. This computer may be of the general type illustrated in Applicant's Assignee's U.S. Pat. No. 2,613,352. Alternatively, flight path control signals may be generated in other suitable coupler equipment such as disclosed in the above U.S. Pat. No. 3,386,689.

In the following description, the aileron and elevator channels of the autopilot apparatus will be described simultaneously with a description of the function thereof in the various modes of operation. The aileron and elevator surface servoes are substantially identical and only one will be described in detail below, corresponding reference characters for the other being primed. In general, the aileron servomotor 25 may be of the general type shown in Applicant's Assignee's U.S. Pat. No. 2,535,046 or 2,751,056 and comprises a capstan 26 having its cable connected into the aircraft's aileron control rigging 27 coupling the aileron with the pilot's control wheel 28. Capstan 26 is selectively coupled with an electric servomotor 29 through an electromagnetic clutch 30 having control winding 31 energized through the engage logic shown schematically in FIG. 2. Motor 29 also drives a speed generator 32 and synchro 33 to provide stabilizing velocity and displacement feedback signals respectively to servo amplifier 34 which also receives surface command signals from the aileron control channel.

The elevator channel also includes an automatic trim control and servomotor 35 which drives the aircraft pitch trim control surface through clutch 36 engaged by energization of clutch winding 37. This trim control system is responsive to any persistent current signal from the elevator servo amplifier 34' and actuates trim servo 35 to adjust the craft pitch trim until the current signal goes to zero.

Figure 3:
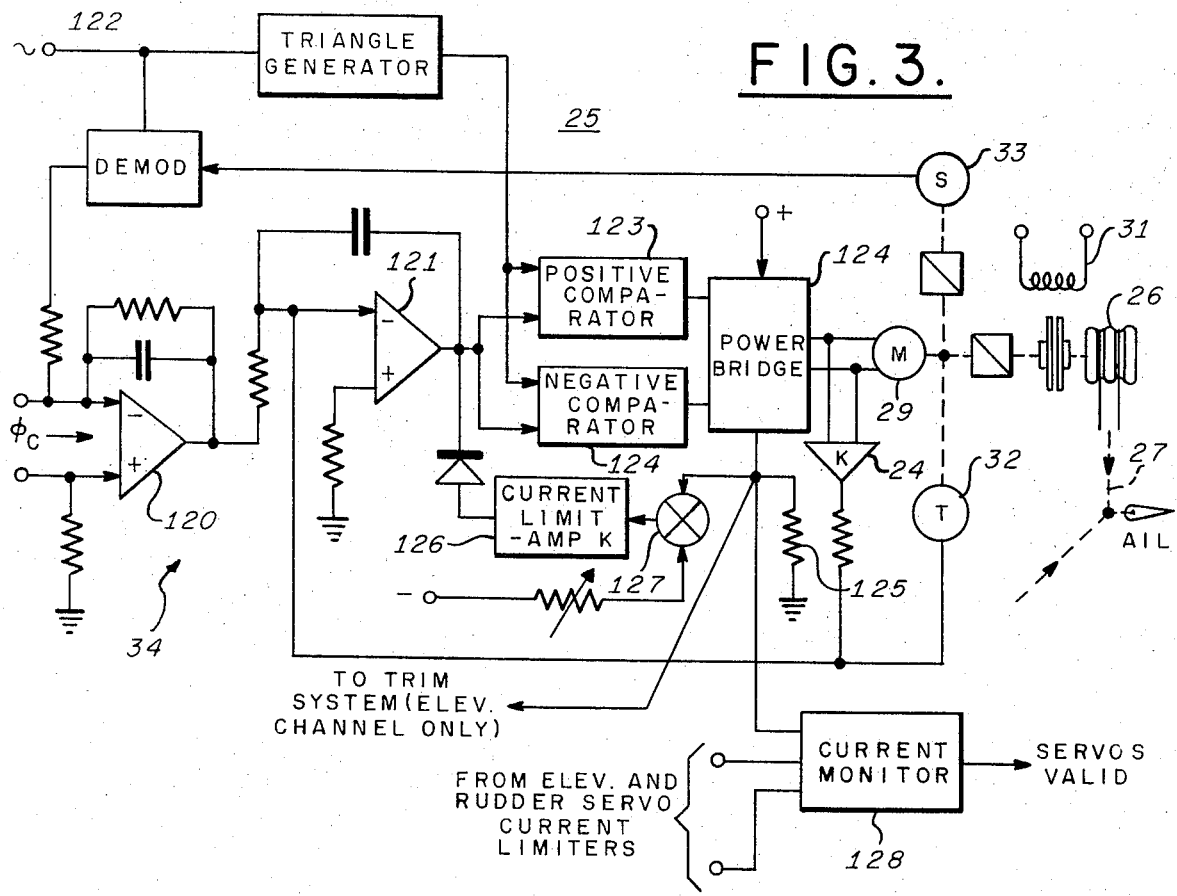
FIG. 3 is a more detailed schematic diagram of the surface servomotor loop shown generally in FIG. 1 and embodying the torque limit feature of the present invention.

In accordance with one of the features of the present invention, each of the surface servomotors is torque limited by means illustrated in more detail in FIG. 3. The aileron servomotor loop 25 is illustrated but it will be understood that the rudder and elevator servomotor loops 13 and 25' are the same. Servo torque motor 29 is a d.c. motor driving control cable drum 26 through electromagnetic clutch 30 and a speed feedback tachometer 32 and position feedback synchro 33. The torque motor control amplifier 34 is a pulsewidth amplifier which supplies a series of pulses to the motor windings having a width proportional to the amplitude of the amplifier input. This is illustrated schematically in FIG. 3 wherein the servo command signal $\phi_C$ and demodulated servo displacement feedback signal from synchro 33 are applied to first stage op amp 120, which provides a smoothing function, the output of which is combined with the servo velocity signal from tachometer 32 and a motor input voltage feedback signal from amplifier 24 and amplified in second stage op amp 121. A.C. supply 122 is converted into a triangular wave and applied to positive and negative comparators 123, 124 respectively, the normal zero reference levels of which are raised and lowered by the positive and negative going outputs of amplifier 121 to thereby generate positive or negative pulses having a pulsewidth proportional in sense and magnitude to the output of amplifier 121 in a conventional fashion. These pulses are applied to a conventional transistor switched motor power bridge 124 which in turn energizes torque motor 29. The bridge is arranged to provide a common current return path to ground through resistor 125. The resulting voltage across resistor 125 proportional to this return current is applied to a current limiter amplifier 126 through summing junction 127. Also supplied to summing junction 127 is a source of negative voltage which is adjustable in accordance with the maximum torque limit to be imposed on the servomotor and is adjusted in accordance with specific aircraft characteristics in which the autopilot system is to be installed. The servo amplifier is normally controlled by the voltage feedback signal across the motor input windings to the input of amplifier 121 through a gain controlling amplifier 24. Thus, motor 29 is a voltage controlled motor controlled by the output of a voltage amplifier characterized by a low output impedance and having desired back emf damping characteristics. When the primary control signal voltage $\phi_c$, servo feedback voltage from synchro 33 or feedback voltage from amplifier 24 are such that the predetermined design torque is exceeded, this condition is reflected by the current proportional to the torque of the motor detected across bridge resistance 125 exceeding the limit determined by the fixed bias voltage applied to summing junction 127. When this occurs, amplifier 126 provides an output voltage proportional to the excess, which voltage is used to drive the reference for the comparators 123, 124 down to thereby reduce the pulse width of the inputs to the power bridge 124 and in turn reduce the torque output of the motor, thus bringing the motor output torque within the desired limit.

The important feature of the foregoing control surface servo amplifier is that prior to current limit, the amplifier is a voltage amplifier with the characteristic of low output impedance. This low output impedance assure maximum use of the back EMF damping of the motor. Only when the current limit is reached does the amplifier transition to a current controlled amplifier, this giving two necessary features for autopilot servo operation.

Since any failure to the current limiter could cause excessive supply current, and no limit on motor torque output, resulting in a safety hazard, it is desirable to monitor the current limiter on all surface servoes. This is accomplished by monitor circuit 128 which is responsive to the current output of all three servoes and supplies a "servo valid" signal to the engage interlocks. An A/P test button may be included on the control panel which, when pressed, will disengage the autopilot if the monitor circuitry is valid.

The roll and pitch channels of the autopilot are engaged by the pilot actuating the A/P ENG. select button 39. This logic signal on the lead from button 39 to the set terminal of flip-flop 41 causing A/P ENG. lead to go high energizing the aileron, elevator and trim servo clutches 31, 31' and 37 respectively through energized CWS switch 42. Simultaneously engage switches, AP. $\overline{CSW}$ 76 to 79 and 113 are actuated. Assume that the pilot engaged the autopilot with the flight director in the standby, SBY mode. The interlocks 40 are arranged to provide three axis stabilization with the roll axis in heading hold, and the pitch axis in pitch hold with automatic pitch trim. These conditions are shown in FIG. 2, where HDG HOLD switch 43 and PITCH HOLD switch 44 are engaged under the conditions indicated.

Assume also that the aircraft was in straight and level flight when engaged. Short term stabilization in roll and pitch are provided by roll attitude rate and pitch attitude rate signals derived from roll and pitch pick-offs on vertical gyro 55 through rate taking circuits 55 and 56, respectively. These signals are supplied directly to the aileron and elevator servo systems 25 and 25' through summing junction 58, 59, respectively, to damp or stabilize the short term attitude perturbations of the aircraft. Roll and pitch attitude displacement reference signals are provided by vertical gyro 55 and these signals are applied directly to summing junctions 52 and 60 in the roll and pitch channels respectively.

In the roll channel the directional gyro 11 becomes the heading hold reference. The heading synchronizer 45 is clamped by heading hold switch 43 and if the heading of the aircraft does not correspond with the reference heading, the resulting heading error signal is supplied through summing junction 46, rate limiter 47, CWS switch 48 (closed for $\overline{CWS}$), summing junction 49, roll hold switch 50 (closed for $\overline{ROLL\ HOLD}$), lag network 51 to summing junction 52. Feedback around lag network 51 through AP. $\overline{CWS}$ switch 77 (closed for AP. $\overline{CWS}$) establishes the time constant of the lag network 51, typically 1 second. The latter circuits constitute one of the features of the present invention and their detailed function will be described below in connection with modes of operation wherein they are most effective. The heading error or roll demand signal is compared with the roll attitude signal at summing junction 52 and applied directly to summing junction 58 at the input of aileron servosystem 25 as an aileron displacement command to return the aircraft to the reference heading and through an integral path 61, the gain of which is quite low, say, 1/10 sec of the displacement gain, to provide long term roll trim. The limit network 62 serves to limit the total roll trim which can be supplied automatically. During autopilot disengage and CWS, the integrator 61 is converted via switch 79 and gain constant 64 to a lag having a gain much less than that of the displacement path to assure proper tracking of the servo loop 25 during this time.

The assumed level pitch attitude at engagement will be held due to the open condition of switch 44 which removes all pitch commands to the input of integrator 65 so that the elevator servo system 25' is responsive only to the vertical gyro pitch attitude signal and pitch rate damping signal. Automatic pitch trim is, of course, operative whenever the autopilot is engaged.

If the autopilot is engaged with the flight director 20 in the SBY mode and the aircraft not being flown through CWS, ROLL HOLD switch 50 will be closed and if the aircraft were in a banked attitude, it will automatically roll level and heading hold switch 43 will cause the roll axis to clamp to the existing heading. The assumed engaged conditions are illustrative and it will be understood that the autopilot may be engaged in other of the selectable modes on the flight director selector 20 and when so engaged, the autopilot will couple smoothly to that mode and acquire or maintain the commanded roll and pitch attitudes. The autopilot may be disengaged simply by pressing the disengage button 69 on the control wheel.

The pitch channel is in the pitch hold mode unless one of the pitch couple modes has been selected on the flight director panel 20 or pitch wheel 70 is rotated or CWS switch 110 is operated as shown in FIG. 2. In the pitch hold mode changes in pitch attitude may be commanded by rotation of the pitch wheel 70 on the autopilot control panel 17. As described more fully in Applicant's copending application Ser. No. 239,122, filed Mar. 29, 1972 entitled "Autopilot Pitch Attitude Control," rotation of the pitch knob rotates a tachometer generator 71 producing a voltage proportional to the pitch wheel rate. At a predetermined "detent" threshold value, level detector 72' (FIG. 2) causes pitch hold switch 44 to close connecting the pitch wheel generator signal to pitch integrator 65 producing at its output a pitch attitude displacement demand signal. This attitude demand is compared with actual pitch attitude to cause the pitch servo 25' to change aircraft pitch attitude to that demanded.

In the roll channel, if in the SBY mode, it is desired to change craft heading, turn knob 72 is rotated actuating detent 73 and also producing a blank command signal from potentiometer 74 of one sense or the opposite sense and proportional to the amount of knob displacement up to a maximum signal proportional to, say, 35 30° bank angle. The detent 73 controls heading hold switch 43 logic to disable the heading hold mode, one effect of which is to cause heading synchronizer 45 to synchronize any signal from directional gyro 11 and turn knob switch 75 (FIG. 1) to close. Since the autopilot is in neither the roll hold nor CWS mode, switches 48 and 50 are as shown. Also, since the autopilot is engaged and not in CWS, switch 76 is open and switch 77 is closed while switches 78 and 79 are closed and open respectively. Since the signal from potentiometer is "man made" its dynamic characteristic is unpredictable depending upon how the pilot rotated the turn knob. It could be introduced gradually or rapidly or even in step function fashion. In some modes, to be described below, such as Heading Select VOR/LOC push button select etc., roll demand signals can and usually are applied step function fashion. The autopilot of the present invention not only compensates for this by providing predetermined limits on the maximum roll rate which can be commanded but in a very simple and economic fashion limits the maximum roll acceleration that can be commanded thereby assuring predictable, smooth and comfortable entry and exit from the commanded turn.

Figure 4:
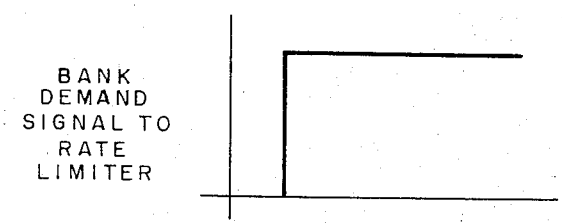
FIG. 4 is a series of signal waveforms useful in describing the acceleration limit feature of the present invention.
Figure 4:
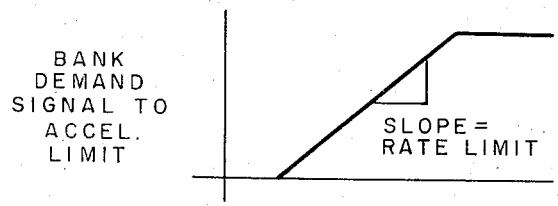
Figure 4:
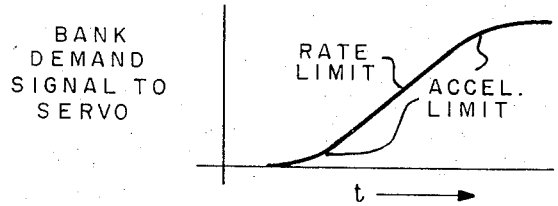

The turn demand signal from turn knob potentiometer 74, which is really a turn rate demand it produces a bank angle, is displacement limited by turn knob stops (see signal characteristic A of FIG. 4 for an abrupt movement thereof) and is then rate limited at limiter 47 (see signal characteristic B of FIG. 4) so that the signal command at the aileron servo limits the aileron displacement to a value which will produce a roll rate of not more than a predetermined number of degrees per second, for example 5°/sec. It is important that the rate limiter has substantially zero lag, that is, a lag much less than the system control frequency. For example, if the acceleration limit lag is one second, the rate limit lag must be less than, say, 0.1 sec. It may be desirable to vary this limit depending upon the autopilot mode. For example, it is sometimes desired for the comfort of the pilot and passengers to reduce the roll rate limit when the aircraft is flying on a VOR course, i.e., a cruise condition. This is accomplished by means of VOR on course logic 80 actuated under the conditions illustrated in FIG. 2.

After rate limiting the roll demand signal is then passed through closed CWS switch 48 and closed roll hold switch 50 to an electronic integrator circuit 51. Since the autopilot is engaged and not in the CWS mode, switch 77 is closed thereby inserting a predetermined gain 81 into a feedback loop around the integrator 51, converting the integrator to a lag network having a time constant of about one second. Another gain 82 on the rate limited demand signal matches this signal with the lag-filter characteristics. The result of the simple lag on the rate limited roll demand signal is to "round off" the signal characteristic (see the signal characteristic C of FIG. 4) and thus limiting the rate of change of the rate limited displacement signal hence acceleration limiting the signal supplied to the aileron servo. Thus, the servo cannot abruptly achieve the displacement commanded but will achieve this displacement in a controlled and predictable manner, i.e., roll acceleration limit is provided. The actual roll attitude produced by the above operation of the aileron servo is detected by vertical gyro 55 and supplied to summing junction 52 to satisfy the roll demand. It will be noted that as the demanded roll attitude is approached and the signal drops below the limit of roll rate limiter 47, the lag filter is again effective to limit the roll deceleration. The function of the roll attitude integrator 61 has already been described.

In order properly to coordinate the turn entry and turn exit with rudder, the roll command signal is differentiated, as by lead circuit 83 and applied to the rudder servo through now closed switch 78, as is generally conventional practice. To prevent loss of altitude during banked turns, a lift compensation signal is supplied to the pitch servo 25' through lift compensation circuit 84. This signal is derived from the bank angle signal from vertical gyro 55 and is generally proportional to the versine of the bank angle. Since, with the autopilot in the airspeed or Mach hold mode, the pitch up produced by the lift compensation signal tends to change the airspeed or Mach speed which the autopilot is trying to maintain, this signal is conflicting and not desired and is therefore inhibited in these modes by means of switch 85 logically controlled as indicated in FIG. 2.

Return of turn knob 72 to detent position results in an opposite sequence of operations described above with turn exit being smoothly achieved through bank rate limit 47 and roll acceleration limiter lag-filter 51, 81.

The autopilot of the present invention is operable in a variety of modes determined by the mode selected by the pilot on flight director mode selector 20 and pitch and roll couple push buttons 90 and 91 respectively on autopilot controller 17. The flight director computer 20, which may be of the general type disclosed in the above-mentioned U.S. Pat. No. 2,613,352 provides all path control computation and mode selection for the autopilot. These modes are referred to herein as "coupled modes" and include in the lateral or roll axis: Heading Select (HDG), VOR and Localizer (VOR/LOC or V/L) and Reverse Localizer Course (REV) and in the vertical or pitch axis: Altitude Hold(ALT), Airspeed Hold (A/S) and Glide Slope (G/S). Each of these modes will be briefly described as they will be referred to in the CWS mode to be described in more detail hereinafter. The autopilot interlock logic is such that if it is engaged with one of the coupled modes of the flight director already selected, the autopilot will automatically couple to the selected mode and the appropriate push buttons 90 and/or 91 will be illuminated. If the autopilot is engaged and no mode is selected on the flight director, subsequent selection of any of the couple modes will couple the autopilot to it and illuminate the appropriate autopilot couple button. Any of the above couple modes may be decoupled by pressing either or both autopilot couple buttons 90 and 91. Also, Turn Knob, Pitch Wheel, Standby and Go Around have priority over any of the coupled modes so that operation of any of the elements controlling these modes will uncouple any coupled mode. Also, in roll, if CWS is used to roll greater than 6° any selected roll coupled mode will be decoupled. Once decoupled by any of the above (except roll CWS) recoupling a selected mode on the panel 20 is accomplished by pressing the roll and/or pitch couple button 90, 91. If the flight direction is in either SBY or G/A mode, selection of any coupled modes will recouple the autopilot to that mode. These coupled mode conditions are schematically illustrated in FIG. 2.

In the coupled heading select, HDG mode, a specific new heading may be automatically achieved by selecting that heading on the heading selector of the flight director system (as in U.S. Pat. No. 2,613,352) schematically indicated at 92 in FIG. 1. This signal's dynamic characteristic, like the turn knob signal is "man made"

so that the roll demand rate limiting acceleration limiting feature of the present invention comes into play to compensate for step like input demands and commands a bank angle proportional to heading error in a predictable and smooth manner. The heading error is displacement limited within the flight director computer corresponding to a predetermined bank angle, say ±27°. As the selected heading is approached and the displacement signal comes out of limit, smooth turn exit is provided due to the roll acceleration limit discussed above.

In the VOR/Localizer mode, V/L, determined by frequency selection, the flight director computer 20 supplies guidance signals to the autopilot via now closed roll couple switch 93. These guidance signals, which may be generated in a manner similar to that shown in the above U.S. Pat. No. 2,613,352, are bank angle demand signals and are supplied to the aileron servo 25 through the roll rate and roll acceleration limit circuits 47, 51, 81 as described above and hence through the direct path and integral path. This limiting is very significant in the V/L mode since step input signals are more likely to occur when selecting these modes. In the V/L mode, the autopilot, responding to the guidance signals, controls the aircraft to approach the guidance beam and when the course error, as detected by course selector in the flight director, is reduced to less than a predetermined value, say 15°, or the bank angle reduces to less than a certain value, say 6°, the on-course mode will be initiated through switch 80, all as shown schematically in FIG. 2. VOR on course detection will reduce the rate limit 47 via switch 80 to provide a smoother more comfortable cruise ride. In the VOR mode it is desired to suppress the radio guidance signal when passing over the VOR transmitter. As described in Applicant's Assignee's U.S. Pat. No. 2,881,992 this is accomplished by sensing the rate of change of the VOR displacement signal in the interlock logic 40 and when the rate becomes erratic or excessive, logic switching occurs (OSS) which decouples through switch 93) the radio guidance signals to summing junction 46 and closes switch 94 substituting only the course error signal therefore whereby the craft continues to automatically fly the compass course (drift corrected when necessary) obtaining at OSS initiation. After the radio rate drops below the threshold, radio guidance signals are again re-engaged. In order to prevent premature disengage and re-engage of the guidance signals due to a momentary increase and reduction of the beam rate around its threshold value, pull in and drop out of the OSS sensor starts a timer, not shown, which maintains the guidance mode or OSS mode for a predetermined time period, say 15 seconds. The localizer mode is selected by tuning a Localizer frequency and operation in this mode is generally the same as the VOR mode, except of course the OSS mode is inhibited.

Associated with the localizer mode is the approach mode which involves the pitch channel of the autopilot. In the approach mode glide slope arm (G/S ARM) is selected on the flight director 20. If either altitude or airspeed modes were previously selected, it would remain in effect until guide slope capture. Selection of G/S ARM closes switch 95 (FIG. 1) which stores a 3° pitch down bias on a capacitor 96. Normally, the glide slope is approached from below the beam, say, in the altitude hold mode. At the bottom edge of the beam, say at a 5 mv fly up signal level, a glide slope detector within the logic 40 responsive to the glide slope deviation signal, fires thereby instituting the glide slope couple mode through switch means 97 and the logic is illustrated in FIG. 2. G/S couple logic closes switches 98, 99 of FIG. 1 an annunciator G/S on Flight Director 20 is illuminated. Switch 98 supplies the glide slope demand signal to pitch servo 25' through a limiter 100 and transient suppression lag filter 101 as a direct path command, while switch 99 supplies the bias on condenser 96 to integrator 65 to establish a 3° pitch down reference in this mode. Integrator 65 is also responsive to the long term G/S demands to remove stand offs in a conventional manner. It will be noted however that at G/S couple, switch 102 is closed placing a predetermined negative limit on the maximum magnitude of the integrator output for preventing over control when approaching the beam from above. In the localizer and G/S modes, gain programming of the G/S signal may be provided in accordance with the teachings of Applicant's Assignee's U.S. Pat. No. 3,381,295.

A reverse course mode is available and is selected in the flight director computer 20. This mode allows the pilot to fly the back course of the localizer beam when necessary. Since a glide slope beam is not normally available on the back course, its function is inhibited as indicated in FIG. 2. 9

Other pitch axis or vertical modes are available through the use of air data computer 105; viz, altitude hold (ALT) mode and airspeed (A/S) (or Mach) hold mode. These modes are selectable on the flight director computer 20 and are engaged through the air data interlock logic 85 of FIG. 2 and the corresponding switches of FIG. 1. Upon selection of altitude hold the existing altitude will be maintained through an altitude error signal supplied by computer 105. This demand signal is processed through limiter 100 and filter 101 and through integral path 65 to provide a command signal to elevator servo system 25' in the same manner as discussed above with respect to the glide slope error signal. The altitude sensor of the air data computer may be of the clutched bellows type such as that shown in Applicant's Assignee's U.S. Pat. No. 2,446,546. The airspeed hold mode established by the logic of FIG. 2 and corresponding switches of FIG. 1 operates in the same manner as the altitude hold mode, the airspeed obtaining at time of selection being maintained through adjustment of pitch attitude. The A/S sensor provides a continuous measure of actual airspeed and may be used for parameter control purposes in a conventional manner. The signal proportional to airspeed error is provided in a manner similar to that for providing heading error; i.e., an electronic synchronizer responsive to the airspeed signal is clamped when airspeed error is desired.

In accordance with the teachings of the present invention, the autopilot has a control wheel steering mode which provides the pilot with all the advantages of the more complex CWS systems of the commercial transport but without the expense, weight and installation complexity of the latter. A switch 110 located on the control wheel 28 allows the pilot to manually control the aircraft attitude through normal control wheel movements. Also, in view of the CWS feature, the turn knob 72 and pitch wheel 70 on controller 17 may be eliminated. The features of the CWS mode will be apparent from a description of typical maneuvers in the vertical and lateral control axes.

Assume first that the autopilot is engaged but none of the coupled modes are selected on flight director 20. Maneuvers may now be made using CWS instead of the pitch and turn knobs on the controller 17 thereby avoiding the need for the pilot to remove his hands from the wheel or direct his attention from other cockpit tasks. Depressing switch 110 energizes the CWS logic 111 and 112 in FIG. 2. Under the assumed conditions, switch 112 opens switch 42 thereby de-energizing the aileron and elevator and trim servo clutch windings 31, 31' and 37 and at the same time changes the state of switches 76, 77, 78, 79 and 113 of FIG. 2 and FIG. 1. The craft is now maneuvered through the aircraft's normal manual surface control system 27, 27'. Assume a pitch up attitude is commanded. Switch 113 is closed and switch 44 is closed and all couple and pitch wheel switches are such that no demand signals are applied at summing junction 114. The only signal applied at junction 114 is the pitch attitude signal from V.G. 55 through the feedback around integrator 65 which by inclusion of gain K in this path causes integrator 65 rapidly to synchronize on the existing pitch attitude. At the desired pitch attitude, the pilot releases CWS switch and this attitude will therefore be maintained by reengagement of pitch servo clutch 30' and opening of switch 113 and 44. Stability augmentation at the new attitude will be supplied through pitch rate taker 56 and the craft will automatically trim at the new attitude through now clutched trim servo 35.

Now assume the pilot depresses CWS switch 110 and rolled to an attitude greater than 6°. The logic of FIG. 2 maintains roll hold switch 50 de-energized, i.e., closed in FIG. 1. During the maneuver switch 48 is open, 76 closed, 77 open, 78 open, and 79 closed whereby all couple signals are removed from summing junction 49, integrator 51 is converted to a fast synchronizer through its feedback gain change 76', lag filter gain 81 is ineffective, roll command cross feed to yaw is interrupted, and roll trim or inner loop integrator 61 is also converted to a fast synchronizer through gain 64. Now upon release of CWS switch 110 all of the foregoing switches revert to their original conditions and ROLL HOLD switch is set, i.e., opened whereby the existing roll attitude, which is now stored in integrator 51 and 61 is maintained and roll trim and turn coordination re-established. Since no couple modes are selected, no demand signals will appear at junction 49 and the craft will continue to turn at a rate determined by the CWS established bank angle.

If the pilot commands through the CWS mode a bank angle less than 6° and the switch 110 released, the craft automatically rolls level and the heading hold mode established. The logic is illustrated in FIG. 2 wherein flip-flop 66 is reset closing switch 50 (FIG. 1) and energizing heading hold switch 43 whereby heading error from directional gyro 11 is supplied as a roll demand through now clamped heading synchronizer 45 as described above.

The control wheel steering feature of the present invention may also be advantageously used to modify the flight path demanded when coupled to many of the modes selected on the flight director 20. For example, assume the A/S couple mode is selected and the autopilot is maintaining a desired airspeed and it is desired to establish a new airspeed, say a let down speed from cruise altitude. The A/S hold mode is, of course, a pitch couple mode and is established by the logic of FIG. 2. Toggled flip-flop 115 establishes pitch couple mode switch 116 upon pitch couple switch 90 on controller 17 being depressed and under the set and clear conditions indicated. Depressing CWS switch 110 disengages pitch couple logic 116 which in turn changes the state of air data switch 85 and opens A/S switch 117 (FIG. 1). Further switching, not shown, synchronizes the airspeed error signal. The pilot establishes the pitch attitude through his control wheel 28, and/or throttles if required, to attain the desired let down airspeed and then releases CWS switch 110. As shown by the logic of FIG. 2, this action returns AD coupler switch 85 to its initial condition, closes switch 117 and clamps the A/S sensor synchronizer whereby the autopilot automatically maintains the airspeed established during CWS mode. The same operation occurs if the pilot wishes to change his altitude or any air data mode through the control wheel steering mode.

In the lateral or roll channel, the CWS mode is particularly convenient. For example, assume that the pilot desires to make a large heading change with the autopilot engaged and coupled in the heading select mode. Normally he would select the new heading using his flight director heading selector. The resulting large error signal is displacement limited within the flight director computer 20, rate limited at 47 and acceleration limited by lag filter 51, 81 as described above and commands a corresponding bank angle through aileron servo 25. However, assume the displacement limits within flight director permit a bank angle substantially larger than the pilot desired to make. For example, for some reason, the pilot wants to make the turn to the new heading at a lower rate. The CWS mode of the present invention provides a means whereby this may conveniently be accomplished. The pilot depresses CWS switch 110, decoupling and synchronizing the autopilot as described above and establishes the lower bank angle he desires. He then selects the desired new heading on his heading selector and releases the CWS switch. As shown in FIG. 2, the release of CWS switch 110 will set flip-flop 66 and place the autopilot in the roll hold mode; switch 48 is open and the bank angle established by CWS is stored in integrator 51 to maintain the bank angle. As the new heading is approached, the heading error drops below the automatic pilot bank angle limit and a corresponding signal appears on lead 130 of FIGS. 1 and 2. This signal is the bank angle demand signal $\phi_D$. As the absolute value of the bank angle demand signal approaches the absolute value of the actual bank angle $\phi$ as set by CWS, and the signals are of the same polarity, interlock comparator 131 (FIG. 2) fires and supplies logic signal to "and" circuit 132. Since the autopilot is engaged and in the roll hold mode the "and" gate is satisfied and triggers "on shot" 133 which in turn sets flip-flop 134 and hence re-establishes the roll couple mode and disengages the roll hold mode. The roll demand, proportional now to heading error reduces toward zero and automatically rolls the aircraft out on the selected heading.

Alternatively, the foregoing automatic operation may be performed semi-automatically using the flight director demand bar. After establishing the desired lower bank angle with CWS and releases the switch 110 his bank will be held and he now dials in his selected heading. As the new heading is approached, he watches the flight director pointer and when it is centered, that is, the bank demand equals the actual bank, he simply presses the roll couple switch 91 on the autopilot controller and the autopilot will automatically roll the craft to level as the new heading is achieved.

The above limit override feature of the CWS mode described above is also conveniently applicable in any of the lateral modes with automatic re-engagement of the roll couple mode when the roll demand is equal to the bank angle established by CWS.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. An automatic flight control system for an aircraft having the usual manual control wheel and control mechanism between it and the craft control surface for controlling the attitude of the craft in accordance with movement of said control wheel, the combination comprising an automatic pilot servomotor system having a servomotor, an output member connected with said control mechanism, and clutch means adapted when engaged to move said control mechanism and control surface in accordance with movement of said servomotor and when disengaged to permit free movement of said control mechanism and control surface by said control column, automatic flight control means including stable attitude reference and flight path control means for controlling said servomotor system when engaged to automatically control said control surfaces to automatically maintain said craft attitude and flight path, control wheel steering means for said automatic flight control system including switch means actuable by the human pilot for disengaging said servomotor clutch means during actuation of said switch means whereby the human pilot may alter said attitude and flight path through said manual control mechanism, and logic means responsive to actuation of said switch means for synchronizing said automatic flight control means to the attitude and flight path established by said human pilot through said manual control mechanism and upon deactuation of said switch means to re-engage said servomotor clutch means whereby said automatic flight control means thereafter controls said aircraft from said manually estalished attitude and flight path.

2. The automatic flight control system as set forth in claim 1 wherein said switch means comprises a depressable button switch mounted on the manual control wheel whereby said button can be depressed to actuate said control wheel steering means without the pilot removing his hands from the control wheel or diverting his attention from cockpit tasks.

3. The automatic flight control system as set forth in claim 1 wherein said automatic flight control means further includes attitude reference means and synchronizing means, and said logic means includes switch means for rendering said synchronizing means responsive to said attitude reference means during actuation of said control wheel switch means whereby said synchronizing means continuously follows up on the attitude of said craft established by the human pilot through said control mechanism, and upon deactuation of said control wheel steering switch means for re-engaging servomotor clutch means and for clamping said attitude synchronizer whereby the manually established attitude is maintained.

4. The automatic flight control system as set forth in claim 3 wherein said attitude reference and synchronization means is responsive to aircraft bank attitude and said automatic flight control means further includes heading attitude means and synchronization means responsive thereto, and said logic means further includes switch means for rendering said bank and heading synchronizing means responsive to said bank and heading attitude means during actuation of said control wheel switch means and the bank angle established by the pilot through said control mechanism is greater than a predetermined value, and said logic means further includes, switch means responsive to bank attitudes greater than said predetermined value and to deactuation of said control wheel switch means for re-engaging said autopilot servomotor, clamping said bank angle synchronizing means and for maintaining said heading synchronizer responsive to said heading attitude signal whereby said craft continues to turn at the bank angle established by the pilot through said control mechanism.

5. The automatic flight control system as set forth in claim 4 wherein said further logic means includes further switch means responsive to bank attitude less than said predetermined value and to deactuation of said control wheel switch means for re-engaging said autopilot servomotor clutch means, clamping said heading synchronizer means, converting said bank synchronizer means to a lag filter means and for rendering said lag filter means responsive to said heading reference means whereby said craft rolls to level flight and thereafter maintains the heading obtaining when said bank attitude attained said predetermined value.

6. The automatic flight control system as set forth in claim 1 wherein said automatic pilot servo as a bank angle control servomotor, said attitude reference means includes a bank attitude reference and, said flight path control means includes flight path computer means for providing a bank angle demand signal proportional to the error between the present craft course and a desired craft course and means for limiting said course error signal to a predetermined value whereby to limit the bank angle demanded thereby, wherein said logic means responsive to actuation of said control wheel switch means synchronizes said bank attitude reference whereby the pilot may manually establish through said control mechanism a bank attitude different from that demanded by said limited course error signal and upon deactuation of said control wheel switch means to re-engage said servomotor and hold said different bank angle, and further logic means responsive to the algebraic sum of said course error signal and said control wheel steering established bank angle signal reducing to zero for automatically releasing said bank attitude hold and thereafter control said servomotor in accordance with said algebraic sum signal whereby said craft thereafter automatically approaches and maintains said desired course.

7. The automatic flight control system as set forth in claim 6 wherein
said desired craft course is a course defined by the bearing of a radio beam.

8. The automatic flight control system as set forth in claim 1 wherein
said control surface controls craft pitch attitude and said autopilot servomotor controls a pitch control surface,
said stable attitude reference means is a pitch attitude reference means and wherein said flight path is a vertical flight path determined by an altitude reference means.

9. The automatic flight control system as set forth in claim 1 wherein
said control surface controls craft pitch attitude and said autopilot servomotor controls a pitch control surface,
said stable reference means is a pitch attitude reference means and wherein said flight path is a vertical flight path determined by an airspeed reference means.

10. An automatic flight control system for controlling the aileron of an aircraft comprising,
a position servomotor coupled with said ailerons for controlling the roll attitude of the craft,
means for producing a roll attitude demand signal, and
means for supplying said demand signal to said servomotor means, said last-mentioned means including, electronic signal limiting means responsive to said attitude demand signal for limiting the maximum rate of change thereof whereby to limit the displacement of said aileron in response thereto whereby to limit the rate of roll of said aircraft, and
an electronic lag filter means having a predetermined time constant and responsive to said rate limited demand signal for limiting the rate of change thereof to limit the rate of change of displacement of said ailerons whereby to limit the resulting roll acceleration of said aircraft in response to said attitude demand signal.

11. The automatic flight control system as set forth in claim 10, wherein said electronic signal limiting means is substantially lag free.

12. The automatic flight control system as set forth in claim 11 wherein said electronic lag filter has a lag time constant on the order of one second and said electronic signal limiting means has a lag time constant on the order of ten times less than said filter lag.

13. The automatic flight control system as set forth in claim 10 wherein said electronic signal limiting means includes means for varying the limit imposed thereby.

14. The automatic flight control system as set forth in claim 10 wherein said electronic lag filter means comprises an electronic integrating amplifier and a feedback circuit from the output of said amplifier to its input including an impedance, and switch means in said feedback circuit responsive to engagement of said autopilot for closing said feedback circuit whereby to convert said integrator to a lag filter.

15. The automatic flight control system as set forth in claim 14 wherein the value of said feedback impedance is such as to provide a lag filter having a time constant on the order of one second.

16. In an automatic flight control system for aircraft having a control surface for controlling the motion of the aircraft about an axis thereof, the combination comprising,
a servomotor including control windings and coupled with said control surface for positioning the same in accordance with a command signal,
power amplifier means responsive to said command signal for providing a motor control signal to said control windings,
means responsive to the signal across said motor control windings for providing a first feedback signal to said amplifier means responsive to the average voltage across said control windings including any back-EMF therein,
means responsive to the current drawn by said servomotor for providing a voltage proportional to the torque exerted on said surface thereby, and
means responsive to said current responsive means for providing a second feedback signal to said amplifier means proportional to the average magnitude of said current in excess of a predetermined value, whereby for currents below said predetermined value said servomotor is a voltage controlled, back EMF damped motor while for currents above said predetermed value said servomotor is a current controlled, torque limited motor.

17. In the automatic flight control system as set forth in claim 16 wherein said current responsive signal means comprises
means for supplying a fixed voltage proportional to the maximum current to be drawn by said servomotor, and
means for comparing said fixed voltage with said voltage proportional to motor current and for supplying a signal in accordance with the difference therebetween.

18. In an automatic flight control system for an aircraft having control surfaces for controlling the motion of said aircraft about a plurality of axes, the combination comprising
a surface servomotor system for each of said control surfaces, each of said servomotor systems comprising
a disconnectable servomotor including control windings and normally connected to drive its associated surface in accordance with a command signal,
power amplfiier means responsive to said command signal for providing a motor control signal to said control windings,
means responsive to the signal across said motor control windings for providing a first feedback signal to said amplifier means responsive to the average voltage across said control windings incuding any back EMF therein, means responsive to the current drawn by said servomotor for providing a voltage proportional to the torque exerted on said surface thereby, means responsive to said current responsive means for providing a second feedback signal to said amplifier means proportional to the average magnitude of said current in excess of a predetermined value, whereby for currents below said predetermined value said servo motor is a voltage controlled, back EMF damped motor while for currents above said predetermined value said servomotor is a current controlled, torque limited motor, and means responsive to each of said current responsive means for disconnecting all of said servomotors from their respective control surface if one or more of said currents exceeds a predetermined value.

* * * * *